US008666656B2

(12) United States Patent
Mikami et al.

(10) Patent No.: US 8,666,656 B2
(45) Date of Patent: Mar. 4, 2014

(54) OBJECT DETECTION DEVICE AND NAVIGATION DEVICE

(75) Inventors: Takashi Mikami, Tokyo (JP); Takashi Hirano, Tokyo (JP); Marika Niiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/981,920

(22) PCT Filed: Dec. 27, 2011

(86) PCT No.: PCT/JP2011/007310
§ 371 (c)(1),
(2), (4) Date: Jul. 26, 2013

(87) PCT Pub. No.: WO2012/120583
PCT Pub. Date: Sep. 13, 2012

(65) Prior Publication Data
US 2013/0311083 A1    Nov. 21, 2013

(30) Foreign Application Priority Data
Mar. 4, 2011    (JP) .................................. 2011-047694

(51) Int. Cl.
*G08G 1/16*    (2006.01)
(52) U.S. Cl.
USPC ........... 701/428; 701/519; 701/300; 701/301; 701/302; 342/27; 342/28
(58) Field of Classification Search
None
See application file for complete search history.

(56) References Cited

U.S. PATENT DOCUMENTS

| 4,490,716 | A | * | 12/1984 | Tsuda et al. | .................. 340/904 |
| 5,026,153 | A | * | 6/1991 | Suzuki et al. | ................ 356/3.16 |
| 5,111,401 | A | * | 5/1992 | Everett et al. | ................... 701/24 |
| 5,214,408 | A | * | 5/1993 | Asayama | ...................... 340/435 |
| 6,151,539 | A | * | 11/2000 | Bergholz et al. | ................. 701/25 |
| 6,476,731 | B1 | * | 11/2002 | Miki et al. | .................... 340/937 |

(Continued)

FOREIGN PATENT DOCUMENTS

| JP | 2006 154975 | 6/2006 |
| JP | 2006 317221 | 11/2006 |

(Continued)

OTHER PUBLICATIONS

International Search Report Issued Feb. 7, 2012 in PCT/JP11/007310 Filed Dec. 27, 2011.

*Primary Examiner* — Jonathan M Dager
(74) *Attorney, Agent, or Firm* — Oblon, Spivak, McClelland, Maier & Neustadt, L.L.P.

(57) ABSTRACT

An object detection device includes: an ultrasonic sensor for transmitting a signal and further receiving reflected signals of the transmitted signal; a delay-sum processing unit for generating two-dimensional distance information in which the reflected signals received by the ultrasonic sensor are delay-summed in a plurality of reference planes set in advance; a distance information integration unit for generating integrated distance information in which the two-dimensional distance information in the plurality of reference planes generated by the delay-sum processing unit is summed in a vertical direction to the reference planes; and an object detection unit for detecting an object at a position where an intensity in the vertical direction is equal to or larger than a threshold value by referring to an intensity in the vertical direction of the integrated distance information generated by the distance information integration unit.

8 Claims, 14 Drawing Sheets

(56) References Cited

U.S. PATENT DOCUMENTS

| | | | |
|---|---|---|---|
| 2004/0210350 A1* | 10/2004 | Rao et al. ............................ 701/1 |
| 2007/0274159 A1 | 11/2007 | Touge | |
| 2008/0294315 A1* | 11/2008 | Breed ............................. 701/49 |
| 2009/0273456 A1* | 11/2009 | Albertini ........................ 340/435 |
| 2012/0278010 A1* | 11/2012 | Wada .............................. 702/56 |
| 2013/0109968 A1* | 5/2013 | Azuma ......................... 600/441 |
| 2013/0147983 A1* | 6/2013 | Park ........................... 348/222.1 |

FOREIGN PATENT DOCUMENTS

| | | |
|---|---|---|
| JP | 2007 248146 | 9/2007 |
| JP | 2007 315892 | 12/2007 |
| JP | 2008 204281 | 9/2008 |
| JP | 2009 264872 | 11/2009 |

\* cited by examiner

FIG.9
(a)
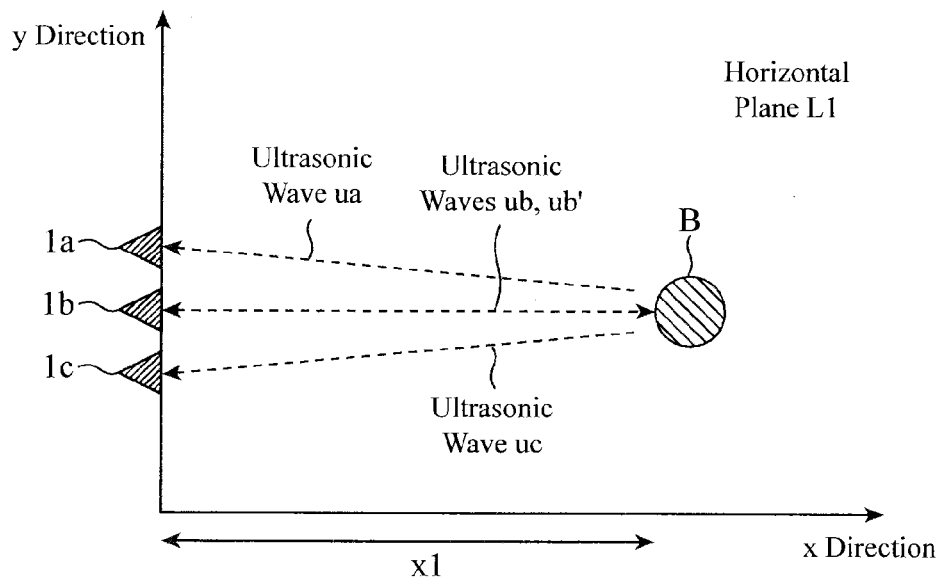
(b)
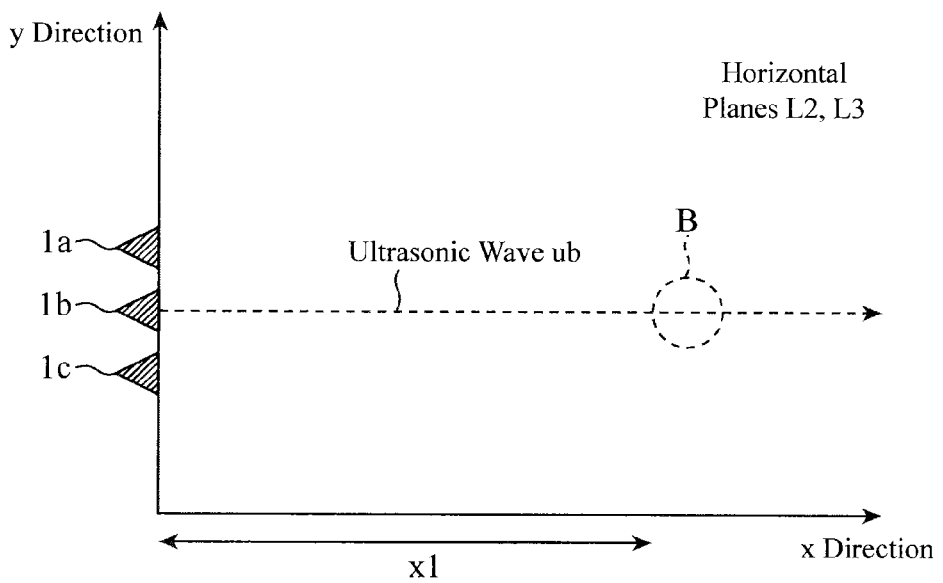

ated distance information in which the two-dimensional distance information in the plurality of reference planes generated by the delay-sum processing unit is summed in a vertical direction to the reference planes; and a detection unit for detecting an object at a position in which an intensity in the vertical direction is equal to or larger than a threshold value by referring to an intensity in the vertical direction of the integrated distance information generated by the integration unit.

OBJECT DETECTION DEVICE AND NAVIGATION DEVICE

TECHNICAL FIELD

The present invention relates to an object detection device for detecting an object based on the reflection result of a transmitted signal, and a navigation device to which the same device is applied.

BACKGROUND ART

There is conventionally disclosed an obstruction detection device for detecting a distance between an object and a sensor by measuring a time required for the return of a reflected wave of an ultrasonic wave transmitted from the sensor, and acquiring a two-dimensional position of the object by delay-summing the signals from a plurality of ultrasonic sensors. For example, in Patent Document 1, there is disclosed a mobile machine including an ultrasonic sensor for receiving the reflections of an ultrasonic wave by a plurality of sensors, and delay-summing the resultant thereof, thereby creating a two-dimensional distance image in a specific horizontal plane.

However, a conventional obstruction detection method has the following problem: when a two-dimensional distance image in a specific horizontal plane is created, a noise or a virtual image appears. As a method for solving this problem, for example, Patent Document 2 discloses the following configuration: the number of ultrasonic sensors to be disposed are increased, and disposed in a close array to thereby reduce the noise, and also the information in the vertical direction of an object is obtained.

PRIOR ART DOCUMENTS

Patent Documents

Patent Document 1: Japanese Patent Application Laid-open No. 2006-154975
Patent Document 2: Japanese Patent Application Laid-open No. 2009-264872

SUMMARY OF THE INVENTION

Problems to be Solved by the Invention

However, in the technology disclosed in Patent Document 2 mentioned above, there is a problem such that a large number of ultrasonic sensors are required, resulting in the increased cost.

The present invention is made to solve the foregoing problem, and an object of the invention is to provide an object detection device for forming a two-dimensional distance image suppressed in noise with a small number of sensors, and acquiring three-dimensional object information.

Means for Solving the Problem

An object detection device of the present invention includes: at least one transmitting sensor for transmitting a signal; at least two or more receiving sensors for receiving a reflected signal of the transmitted signal; a delay-sum processing unit for generating two-dimensional distance information in which two or more reflected signals received by the receiving sensors are delay-summed in a plurality of reference planes set in advance; an integration unit for generating integrated distance information in which the two-dimen-

Effect of the Invention

According to the invention, it is possible to generate the two-dimensional distance information that is suppressed in noise with a small number of sensors, and further to acquire three-dimensional object information taking account of the information in the vertical direction to the reference plane.

BRIEF DESCRIPTION OF THE DRAWINGS

FIG. 9 is a set of views each showing one example showing distance images of the obstruction B of the object detection device in accordance with Embodiment 1.

BEST MODE FOR CARRYING OUT THE INVENTION

In the following, in order to explain the present invention in more detail, embodiments for carrying out the invention will be described with reference to the accompanying drawings.

Embodiment 1

Figure 1:
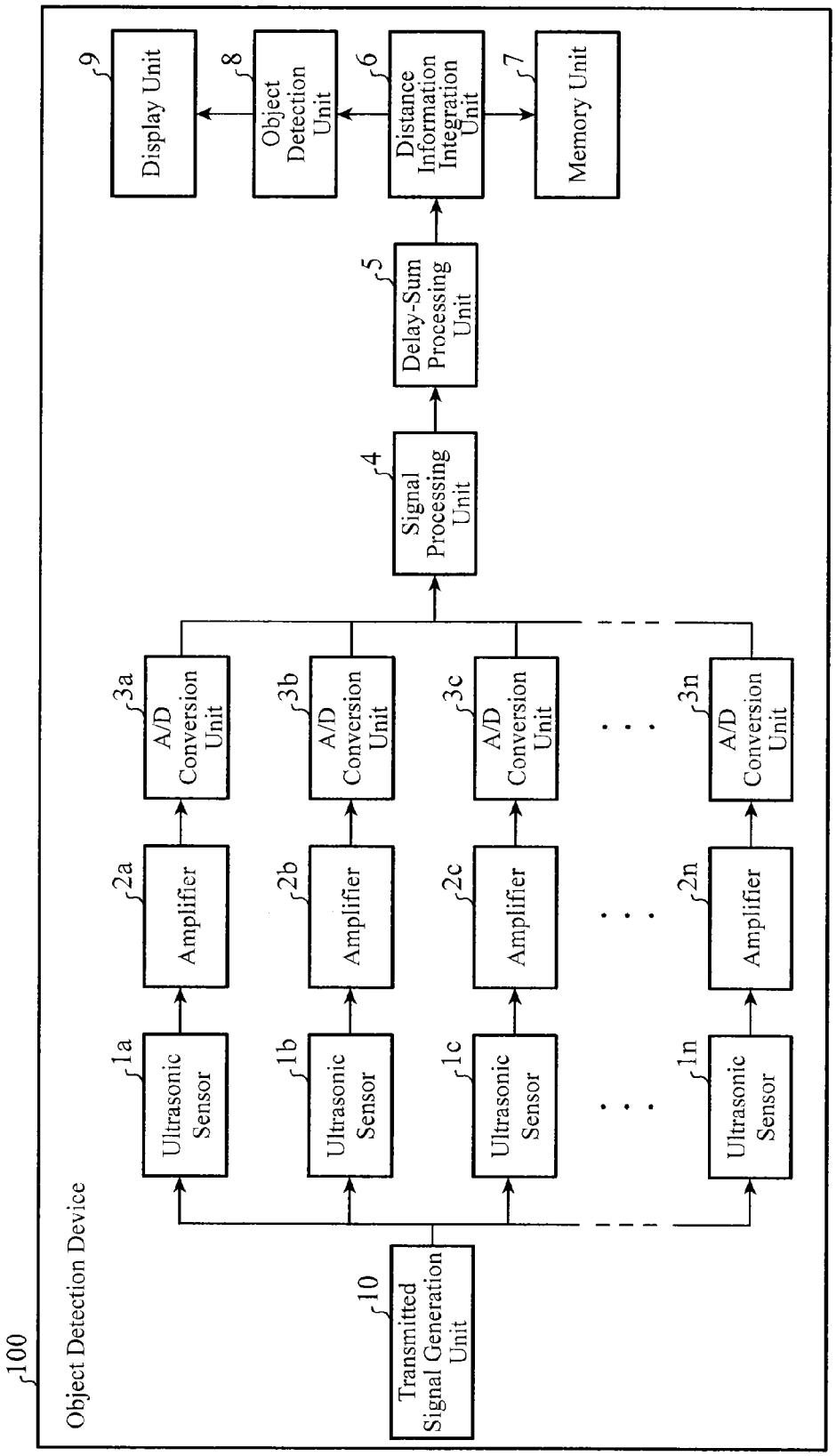
FIG. 1 is a block diagram showing a configuration of an object detection device in accordance with Embodiment 1.

FIG. 1 is a block diagram showing a configuration of an object detection device of Embodiment 1 of the present invention.

An object detection device 100 of Embodiment 1 is constituted by an ultrasonic sensor 1, an amplifier 2, an A/D conversion unit 3, a signal processing unit 4, a delay-sum processing unit 5, a distance information integration unit 6, a memory unit 7, an object detection unit 8, a display unit 9, and a transmitted signal generation unit 10.

Ultrasonic sensors 1a, 1b, 1c, . . . , and 1n (hereinafter, indicated by the ultrasonic sensor 1 when collectively called) are sensors for performing transmission and reception of ultrasonic waves. The ultrasonic sensor 1 is constituted by at least one sensor for transmitting the ultrasonic wave, and at least two or more sensors for receiving a reflected wave of the transmitted wave. Incidentally, it can also be configured such that the sensor for transmitting the ultrasonic wave receives the reflected wave. The mounting position of the ultrasonic sensor 1 is assumed to be known, and the sensor is mounted at a position enabling emission of the ultrasonic wave within a region in which detection of an object is desired. The amplifiers 2a, 2b, 2c, . . . , and 2n (hereinafter, indicated by amplifier 2 when collectively called) amplify the signal received by the corresponding ultrasonic sensor 1. The A/D conversion units 3a, 3b, 3c, . . . , and 3n (hereinafter, indicated by the A/D conversion unit 3 when collectively called) convert a signal of an analog value which is received by the ultrasonic sensor 1 and amplified by the amplifier 2 into a digital signal.

The signal processing unit 4 performs preprocessing to the digital signal obtained from each A/D conversion unit 3 before delay-summing. The details of the preprocessing will be described later. The delay-sum processing unit 5 delay-sums the plurality of signals that are subjected to the preprocessing at the signal processing unit 4, and generates distance information on a certain specific plane. Incidentally, the distance information may be a distance image or the like. In the following description, there will be shown a configuration in which processing is performed using the generated distance image. The distance information integration unit 6 integrates the distance images created by the delay-sum processing unit 5 in a vertical direction to a certain specific plane, and stores the resultant in the memory unit 7. The object detection unit 8 detects the object from an integrated distance image (integrated distance information) integrated by the distance information integration unit 6. The display unit 9 presents the object detected by the object detection unit 8 to a user. The transmitted signal generation unit 10 drives the signal to be transmitted from the ultrasonic sensor 1.

Next, an operation thereof will be described.

Figure 2:
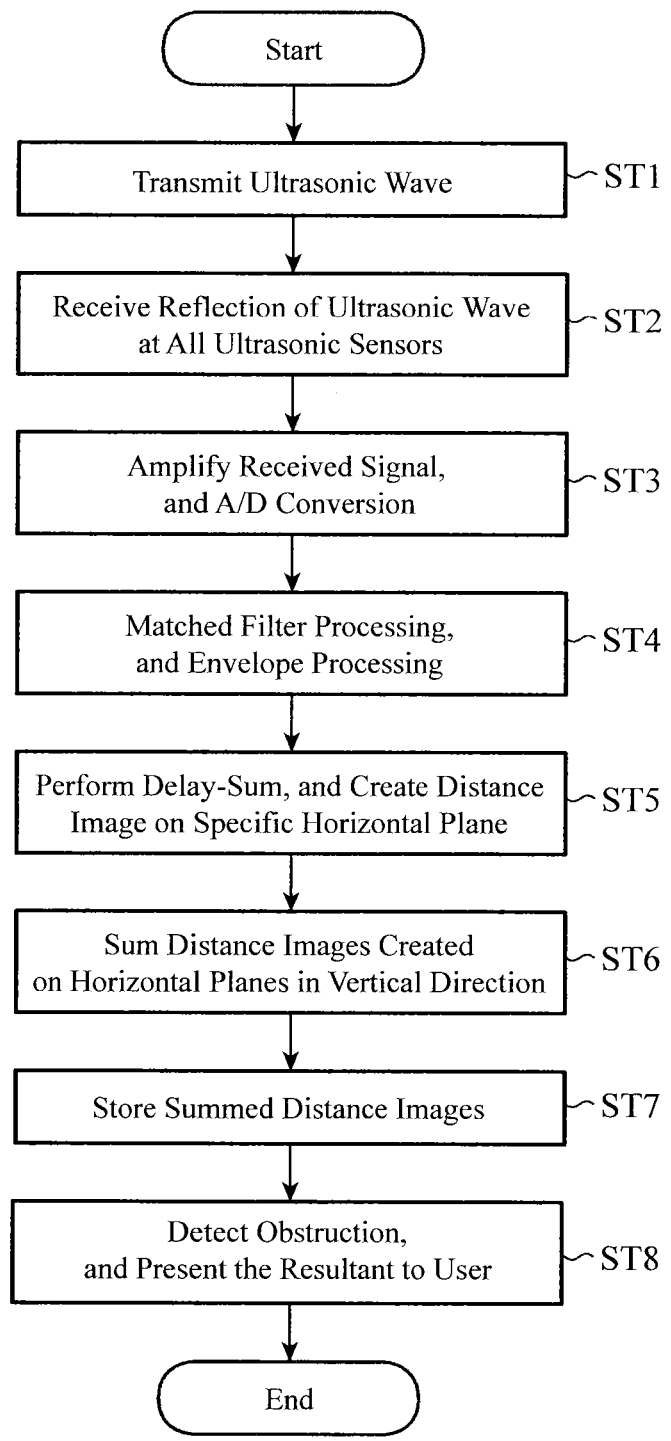
FIG. 2 is a flowchart showing an operation of the object detection device in accordance with Embodiment 1.

FIG. 2 is a flowchart showing an operation of the object detection device in accordance with Embodiment 1. It is noted that in the description of the operation of the object detection device 100, the description will be given of a case where the ultrasonic wave is transmitted from the ultrasonic sensor 1b, and the reflected wave is received by the ultrasonic sensors 1a, 1b, and 1c as an example. Further, the description will be given assuming that the object to be detected by the object detection unit 8 is an obstruction.

First, the coded signal is driven by the transmitted signal generation unit 10, and the ultrasonic wave is transmitted from the ultrasonic sensor 1b (Step ST1). Incidentally, a Barker code or the like is used for coding of the signal. All the ultrasonic sensors 1a, 1b, and 1c each receive the reflection of the ultrasonic wave transmitted at Step ST1 for a prescribed time (Step ST2). The signals of the reflected waves received at Step ST2 are amplified at the amplifiers 2a, 2b, and 2c, and converted into the digital signals at the A/D conversion units 3a, 3b, and 3c, respectively, to be outputted to the signal processing unit 4 (Step ST3).

Figure 3:
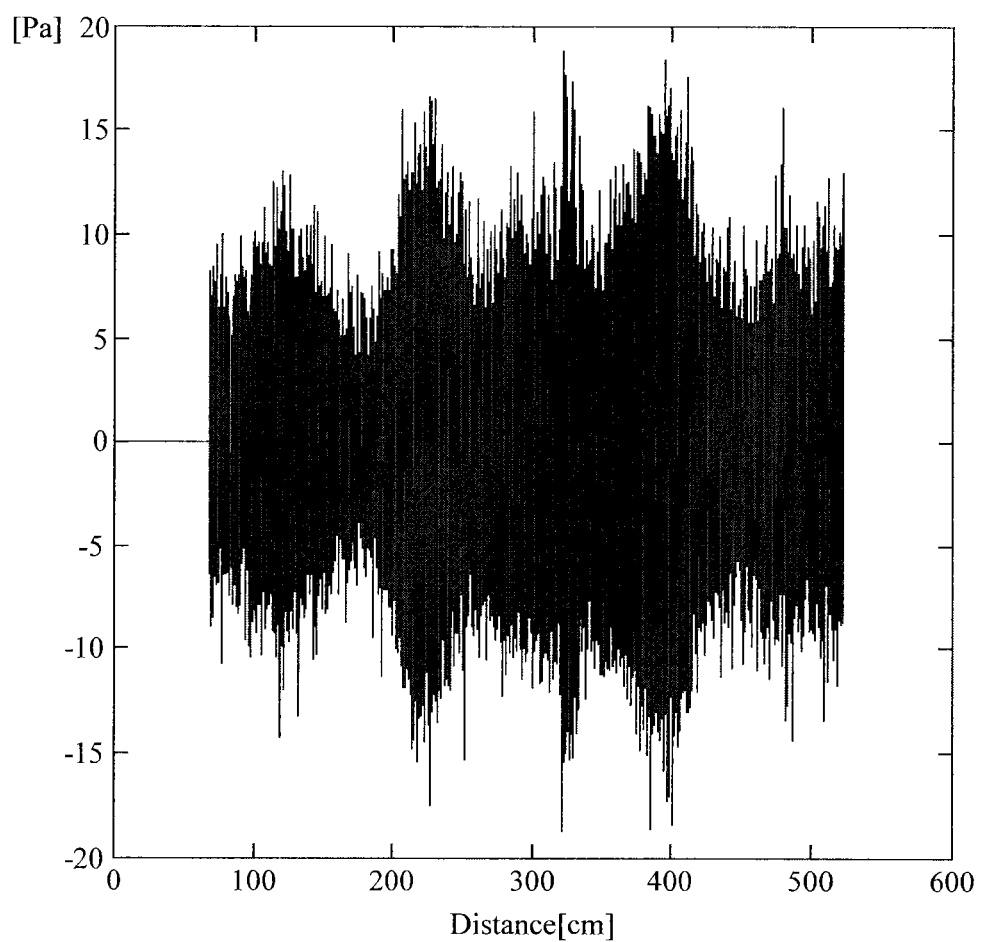
FIG. 3 is a view showing unprocessed signals to be inputted to a signal processing unit of the object detection device in accordance with Embodiment 1.
Figure 4:
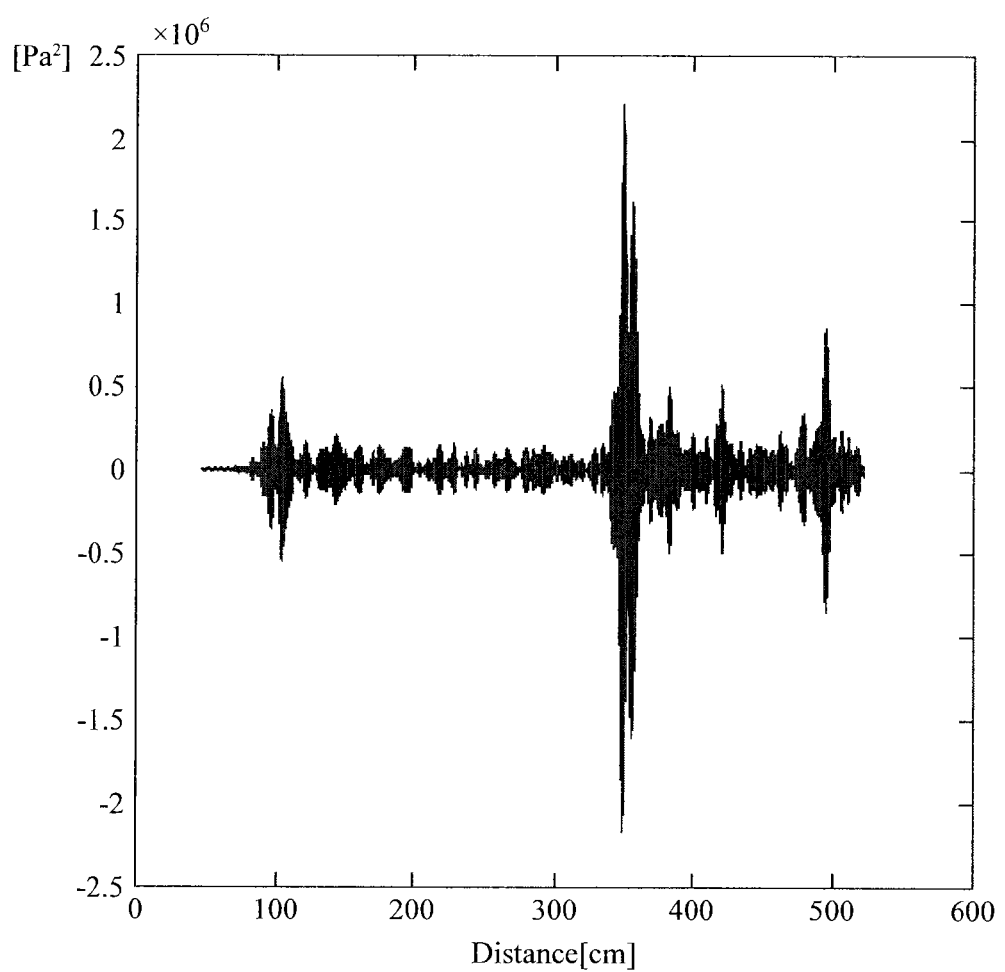
FIG. 4 is a view showing signals that are subjected to matched filter processing by the signal processing unit of the object detection device in accordance with Embodiment 1.
Figure 5:
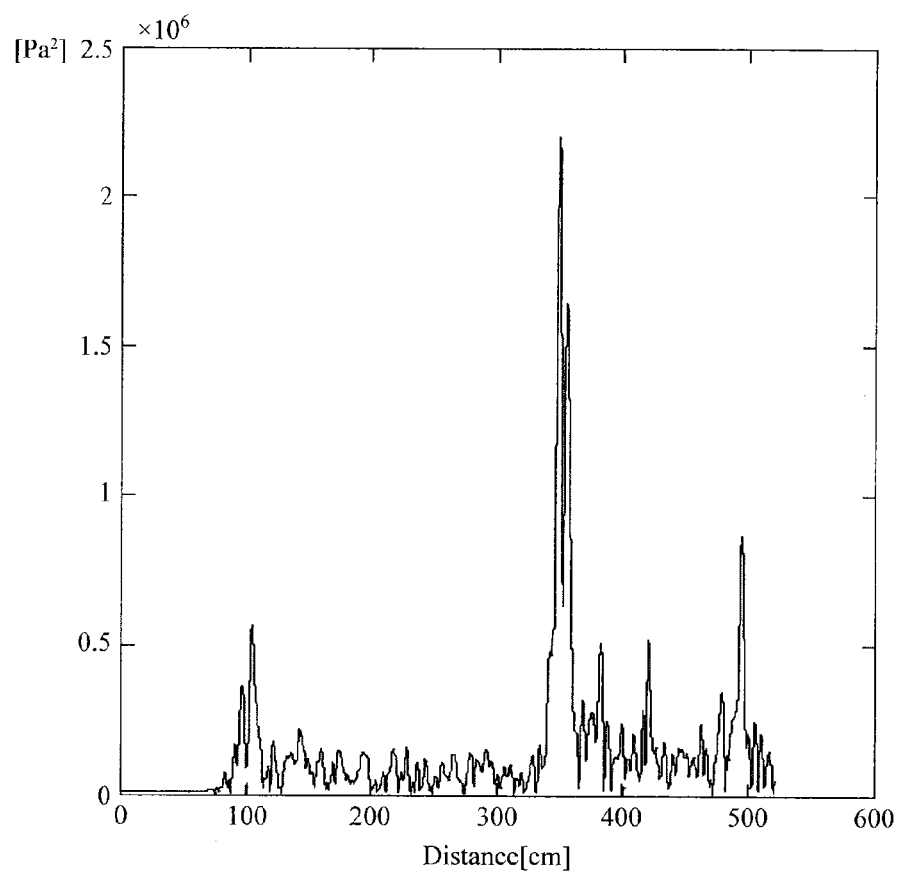
FIG. 5 is a view showing signals after envelope processing by the signal processing unit of the object detection device in accordance with Embodiment 1.

The signal processing unit 4 performs matched filter processing to the digital signal inputted from the A/D conversion unit 3 as the preprocessing of the delay-summing to thereby suppress the noise. Further, envelope processing is performed such that the signals suppressed in noise are subjected to absolute value processing, and are all converted into signals in a positive direction (Step ST4). FIG. 3 shows unprocessed signals inputted to the signal processing unit 4, FIG. 4 shows signals after the matched filter processing, and FIG. 5 is a view showing signals after the envelope processing. FIGS. 3 to 5 each show the signal intensity to the distance from the setting position of the ultrasonic sensor 1.

By a synthetic aperture method, the delay-sum processing unit 5 delay-sums the signals obtained at Step ST4 for all the ultrasonic sensors 1 on a mesh in a grid on a specific plane (which is herein assumed a plane horizontal to the ground on which the obstruction is disposed. Hereinafter, it will be indicated by a specific horizontal plane) to thereby create the distance image on the specific horizontal plane (Step ST5). It is noted that the processing at Step ST5 is performed on the plurality of specific horizontal planes.

The synthetic aperture method uses the following: in summation of signal values, when a specific region on the specific horizontal plane is decided to be prepared in the mesh, the distance between each ultrasonic sensor 1 and the center point of each cell of the mesh is uniquely determined. Namely, the distance of each path in which the reflected wave of the ultrasonic wave transmitted from the ultrasonic sensor 1b is received by the three ultrasonic sensors 1a, 1b, and 1c is determined, and the corresponding distance is divided by the sonic speed, so that the delay time of the reflected wave is determined for each of the three signals. While the determined delay time of the reflected wave is subtracted therefrom, and the signals are summed on the mesh, so that the reflected waves received by the three ultrasonic sensors can be observed synchronously. In such a way, the signals intensify each other only on the cell on which the obstruction exists, thereby specifying the position of the obstruction.

The distance information integration unit 6 sums the distance images created (prepared) on the plurality of specific horizontal planes in the vertical direction to the corresponding specific horizontal plane (Step ST6). Incidentally, the preparation of a three-dimensional distance image requires the obstruction resolving power in the vertical direction to the specific horizontal plane; instead of the summing processing, the images are prepared in such a manner that the mesh is defined in the vertical direction, and that two-dimensional distance images are arranged thereon; however, in Embodiment 1, it suffices that whether the obstruction is present or not can be judged, and the distance image with less noise can be generated through the summing like the processing at Step ST6.

The distance image summed at Step ST6 is stored in the memory unit 7 (Step ST7). Further, the object detection unit 8 refers to the distance image summed at Step ST6, specifies the position having a signal intensity equal to or higher than a detection threshold value set in advance to detect the obstruction, and presents the detection result to a user via the display unit 9 (Step ST8).

A method in which the object detection unit 8 detects the obstruction from the distance image summed at Step ST6 will be described in detail by reference to FIGS. 6 to 9.

Figure 6:
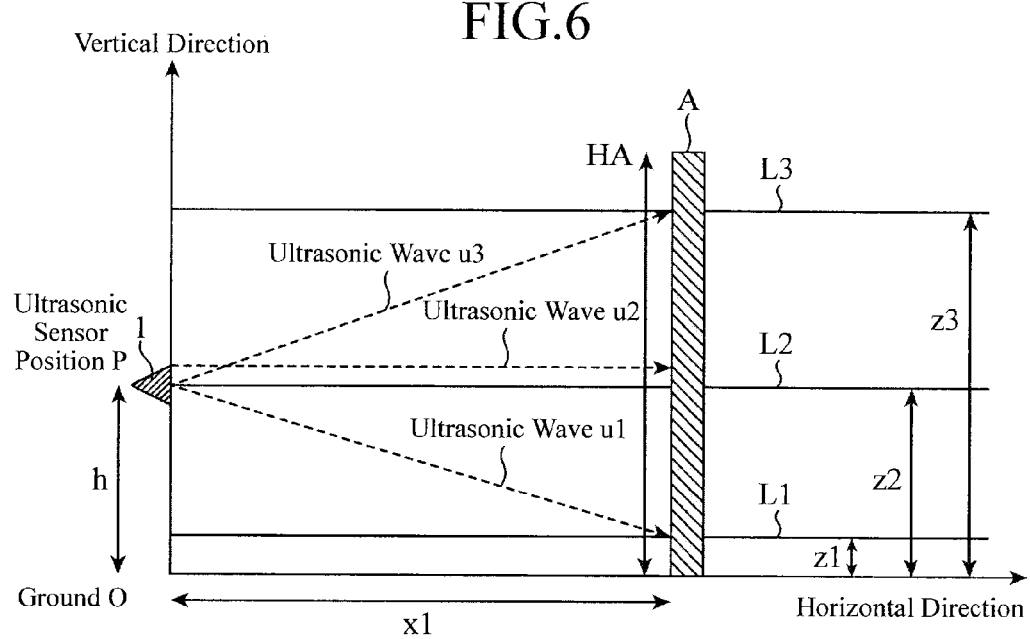
FIG. 6 is a view of a configuration in which the object detection device in accordance with Embodiment 1 detects an obstruction A when as seen from the side thereof.

FIG. 6 is a view of a configuration in which that the object detection device in accordance with Embodiment 1 detects an obstruction A as seen from the side thereof. When the height of a disposed position P of the ultrasonic sensor 1 from a ground O is h, and the height of the obstruction A from the ground O is HA, three specific horizontal planes L1, L2, and L3 are considered. The heights of the specific horizontal planes L1, L2, and L3 are z1, z2, and z3, respectively. Further, the relationship of the following equation (1) is assumed to be satisfied.

$$z1 < h = z2 < z3 < HA \tag{1}$$

In FIG. 6, even when the distance image is generated at any specific horizontal plane L1, L2, or L3, ultrasonic waves u1, u2, and u3 are reflected by the obstruction at a position x1 in a horizontal direction, and therefore the obstruction A is detected.

Figure 7:
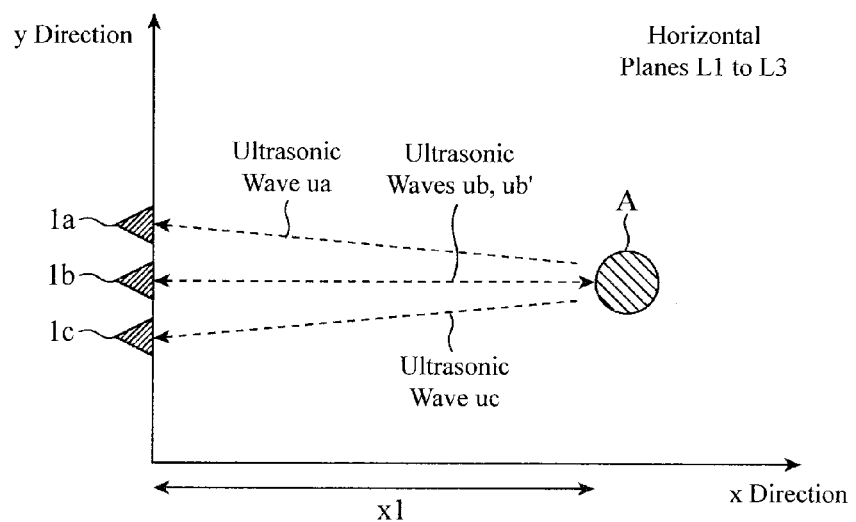
FIG. 7 is one example showing distance images of the obstruction A of the object detection device in accordance with Embodiment 1.

FIG. 7 is a view showing one example of the distance images in the specific horizontal plane L1, the specific horizontal plane L2, and the specific horizontal plane L3 shown in FIG. 6. The ultrasonic wave ub transmitted from the ultrasonic sensor 1b is reflected by the obstruction A, the reflected ultrasonic waves ua, ub', and uc are received by the ultrasonic sensors 1a, 1b, and 1c, respectively, and therefore the obstruction A is detected. Further, the obstruction A is detected in each of the specific horizontal planes L1, L2, and L3; thus, when the distance images in the specific horizontal planes L1, L2, and L3 are summed in the vertical direction to the specific horizontal planes L1, L2, and L3, the obstruction A is detected in a further enhanced manner. In such a way, the obstruction A is detected more likely as an object in the object detection unit 8.

Figure 8:
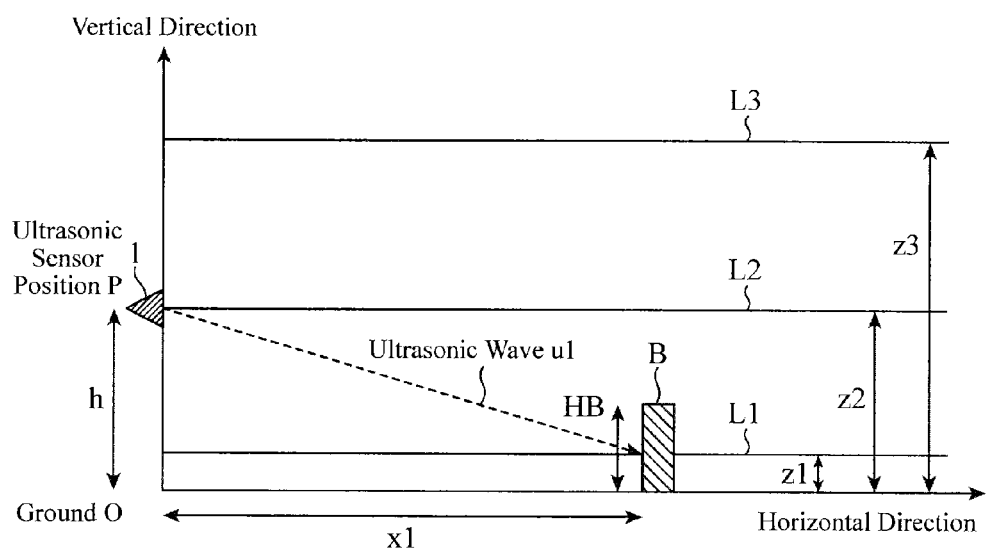
FIG. 8 is a view of a configuration in which the object detection device in accordance with Embodiment 1 detects an obstruction B when seen from the side thereof.

On the other hand, FIG. 8 is a view of a configuration in which the object detection device in accordance with Embodiment 1 detects an obstruction B as seen from the side thereof.

When the height of the disposed position P of the ultrasonic sensor 1 from the ground O is h, and the height of the obstruction B from the ground O is HB, the three specific horizontal planes L1, L2, and L3 are considered. The heights of the specific horizontal planes L1, L2, and L3 are z1, z2, and z3, respectively. Further, the relationship of the following equation (2) is assumed to be satisfied.

$$z1 < HB < h = z2 < z3 \tag{2}$$

In FIG. 8, only when the distance image in the specific horizontal plane L1 is generated, the ultrasonic wave u1 is reflected by the obstruction B at the position x1 in the horizontal direction, and therefore the obstruction B is detected. In the distance images in the specific horizontal plane L2 and the specific horizontal plane L3, the obstruction B is not detected at the position x1 in the horizontal direction.

FIG. 9(a) is a view showing one example of the distance image in the specific horizontal plane L1 shown in FIG. 8, and FIG. 9(b) is a view showing one example of the distance images in the specific horizontal plane L2 and the specific horizontal plane L3 shown in FIG. 8. In FIG. 9(a), the ultrasonic wave ub transmitted from the ultrasonic sensor 1b is reflected by the obstruction B, and the reflected ultrasonic waves ua, ub', and uc are received by the ultrasonic sensors 1a, 1b, and 1c, respectively, so that the obstruction B is detected. On the other hand, in FIG. 9(b), the ultrasonic wave ub transmitted from the ultrasonic sensor 1b is not reflected by the obstruction B, and the obstruction B is not detected. Therefore, when the three distance images in the specific horizontal planes L1, L2, and L3 are summed, the signal corresponding to the obstruction B becomes relatively weaker. In such a way, the obstruction B is detected less likely as the object in the object detection unit 8.

As described above, in accordance with Embodiment 1, it is configured to include: the plurality of ultrasonic sensors 1 for transmitting the ultrasonic wave, and receiving the reflected wave of the transmitted ultrasonic wave; the delay-sum processing unit 5 for delay-summing the signals of the reflected waves received by the plurality of ultrasonic sensors 1, and creating the distance images on the specific planes; and the distance information integration unit 6 for summing and integrating the distance images created on the plurality of specific planes in the vertical direction to the specific planes, and hence the information in correlation with the vertical direction to the specific planes is emphasized, so that an object having a certain degree of size is detected more likely without detecting a small object that is equal to or smaller than the detection threshold value set in advance. Further, it is possible to perform smoothing of an electric noise and fluctuation of the reflected wave not in correlation with the vertical direction, and it is possible to generate a high-precision distance image with a small number of ultrasonic sensors.

Incidentally, in Embodiment 1 mentioned above, there is shown the configuration in which the delay-sum processing unit 5 delay-sums the signals of the reflected waves, and creates the distance images on the specific planes; however, the created data is not limited to the image, and can be appropriately changed.

Embodiment 2

Figure 10:
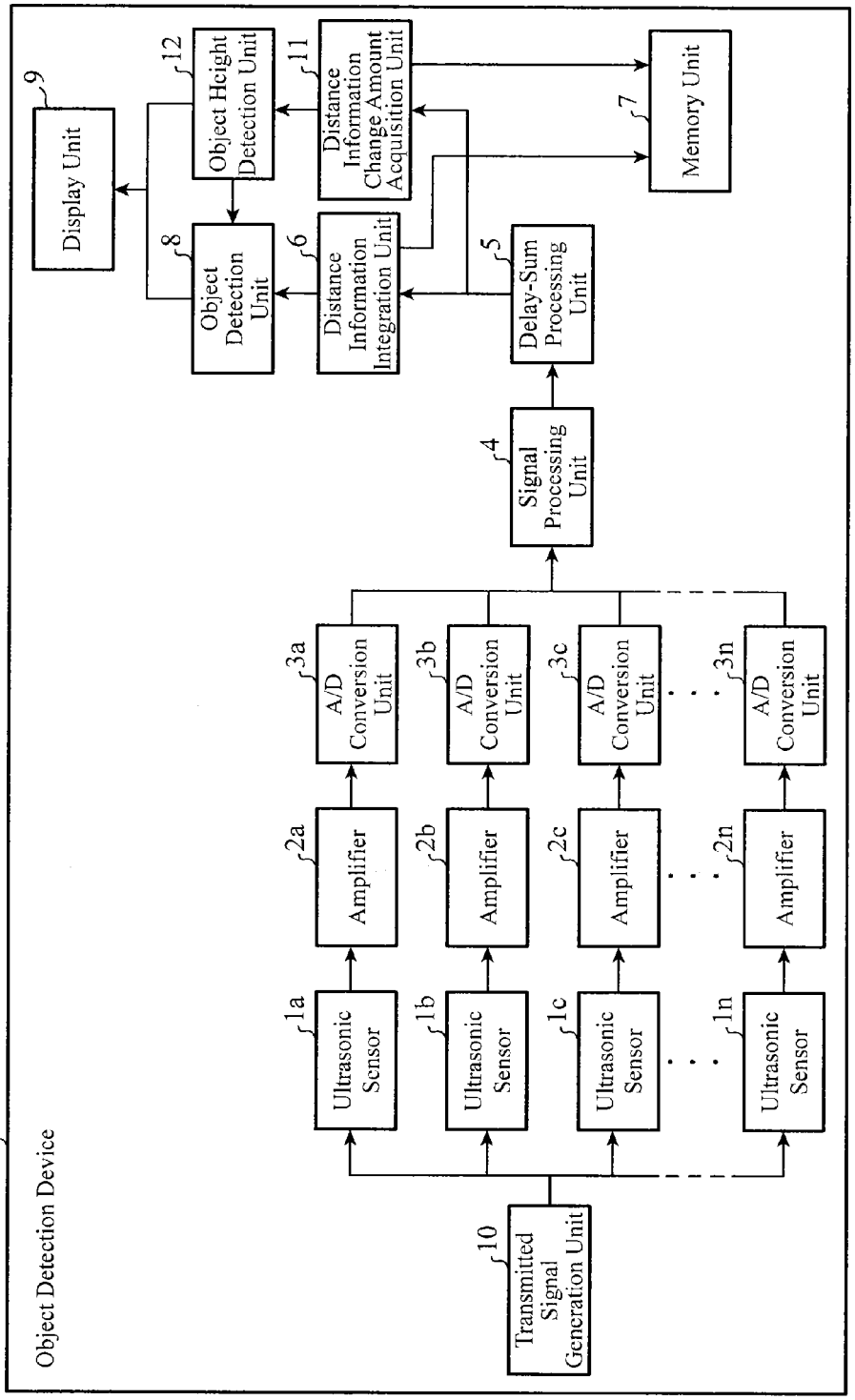
FIG. 10 is a block diagram showing a configuration of an object detection device in accordance with Embodiment 2.

In Embodiment 1 mentioned above, there is shown the following configuration: the correlations in the vertical direction to the specific planes are summed to emphasize the object, and the object is detected with the distance image that is suppressed in noise; however, in Embodiment 2, there is shown a configuration in which the height information of the object is obtained with the change amount of the signals in the vertical direction to the specific planes. FIG. 10 is a block diagram showing a configuration of an object detection device in accordance with Embodiment 2. It is noted that hereinafter the same or corresponding parts as the components of the object detection device in accordance with Embodiment 1 are denoted by the same reference numerals and signs as those used in Embodiment 1, and descriptions thereof will be omitted or simplified. An object detection device 100 shown in FIG. 10 includes a distance information change amount acquisition unit 11 and an object height detection unit 12 that are disposed in addition to the object detection device 100 described by reference to FIG. 1 in Embodiment 1 described above.

The distance information change amount acquisition unit 11 acquires the detected position of the object and the change amount of the signal intensity from a difference among a plurality of image distances created in a delay-sum processing unit 5. The object height detection unit 12 acquires the height information of the object from the detected position of the object and the change amount of the signal intensity that are acquired by the distance information change amount acquisition unit 11. The ultrasonic sensors 1 include at least one sensor for transmitting an ultrasonic wave, and at least three or more sensors for receiving the reflected wave of the transmitted wave. Incidentally, similarly to that of Embodiment 1, it can also be configured such that the sensor for transmitting the ultrasonic wave receives the reflected wave. The mounting position of the ultrasonic sensor 1 is assumed to be known, and is mounted at a position enabling emission of the ultrasonic wave within a region in which the detection of the object is desired.

Next, processing operations of the distance information change amount acquisition unit 11 and the object height detection unit 12 will be described by reference to FIGS. 11 to 15. It is noted that the description will be given assuming that the object to be detected is an obstruction, similarly to that of Embodiment 1.

Figure 11:
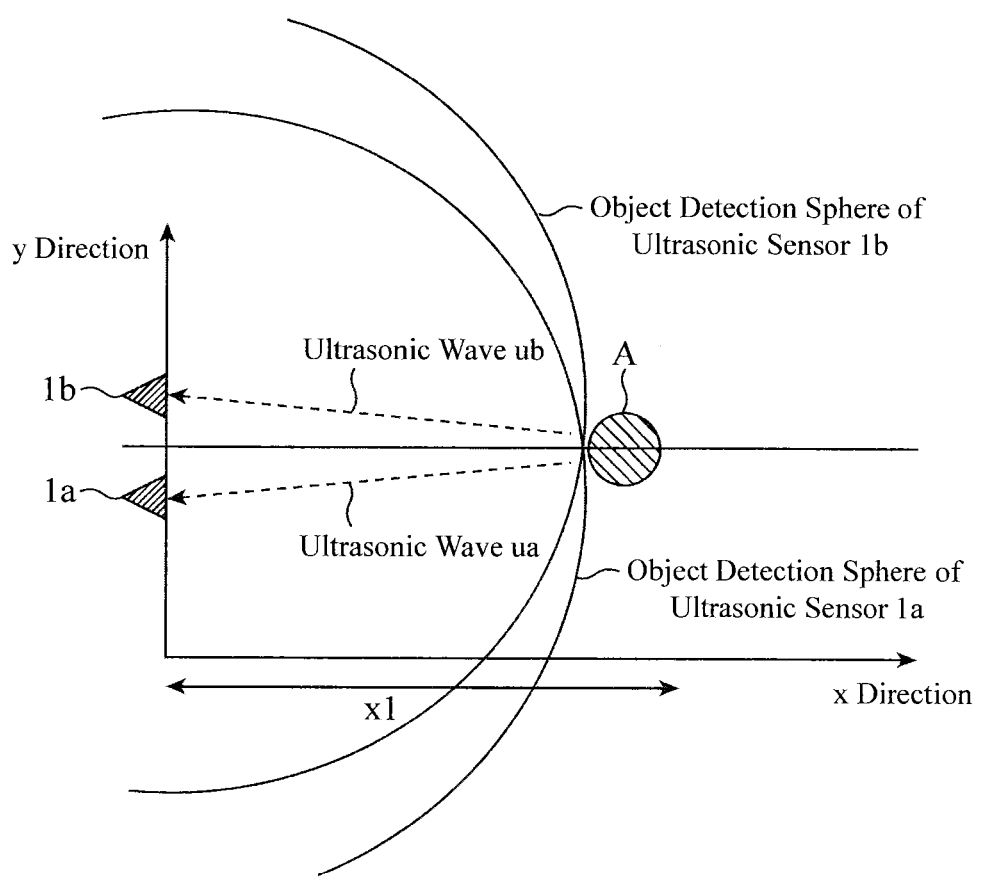
FIG. 11 is a view showing an object detection sphere with an obstruction A of the object detection device in accordance with Embodiment 2.

FIG. 11 is a view showing an object detection sphere with an obstruction A of the object detection device in accordance with Embodiment 2. Incidentally, in Embodiment 2, as mentioned above, the ultrasonic sensor 1 for receiving the reflected wave include at least three or more sensors; however, in FIG. 11, a configuration in which two ultrasonic sensors 1*a* and 1*b* receive reflected waves is exceptionally shown for illustration.

First, the delay-sum processing unit 5 acquires a delay time from a transmission time of the signal of the reflected wave received by the ultrasonic sensor 1, a distance between the ultrasonic sensor 1 and the obstruction A is calculated with the use of the corresponding delay time. The obstruction A exists somewhere on a sphere in which a radius from the ultrasonic sensor 1 is equal to the calculated distance. Further, as shown in FIG. 11, when two spheres with the two ultrasonic sensors 1*a* and 1*b* as their respective centers and each having a radius of the calculated distance are drawn, it turns out that the obstruction A exists on the line of intersection (circumferences) of the said two spheres.

Figure 12:
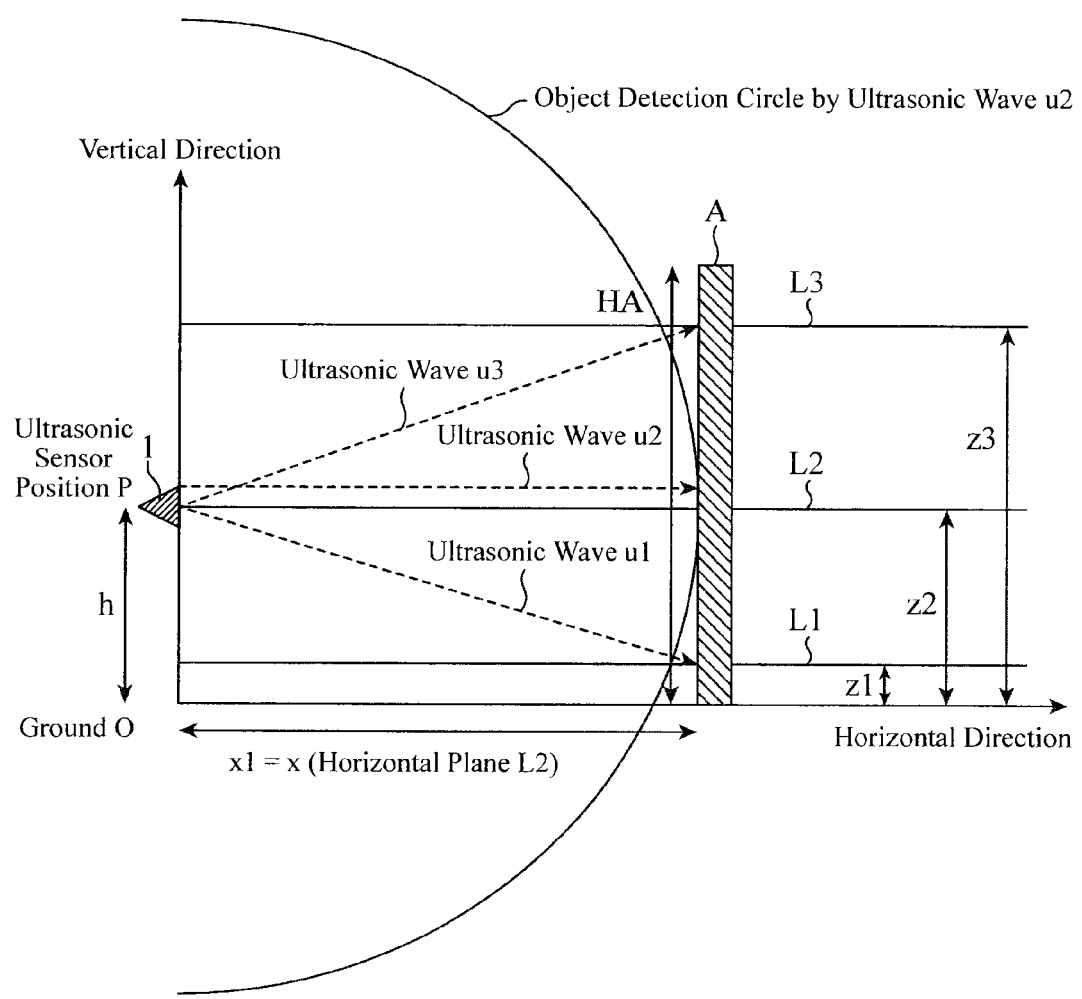
FIG. 12 is a view showing an object detection circle by an ultrasonic wave u2 to the obstruction A of the object detection device in accordance with Embodiment 2.

FIG. 12 shows an object detection circle by an ultrasonic wave u2 outputted in the horizontal direction to the specific horizontal plane L2, and the line of intersection between the two spheres of the ultrasonic sensor 1*a* and the ultrasonic sensor 1*b* shown in FIG. 11. Further, although not depicted in FIG. 12, an object detection circle by an ultrasonic wave u1 and an object detection circle by an ultrasonic wave u3 are also generated in a similar manner. The distance information integration unit 6 sums these object detection circles generated by the delay-sum processing unit 5 in the vertical direction to specific horizontal planes L1, L2, and L3, and thereby generates an integrated distance image suppressed in noise.

On the other hand, referring to the peak intensities of the ultrasonic waves u1, u2, and u3, the reflected wave of the ultrasonic wave u2 outputted from the front to the obstruction A is observed as the largest one. This is because the directivity of transmission/reception of a general ultrasonic sensor is highest in the front direction. When the distance image is created in the specific horizontal plane L2, the obstruction A is observed at a position x1 which is a point of intersection between the object detection circle by the ultrasonic wave u2 of the ultrasonic sensor 1*a* and the specific horizontal plane L2. Another object detection sphere of the ultrasonic sensor 1*b* also crosses at the said point of intersection, and therefore the signals are intensified with each other.

Figure 13:
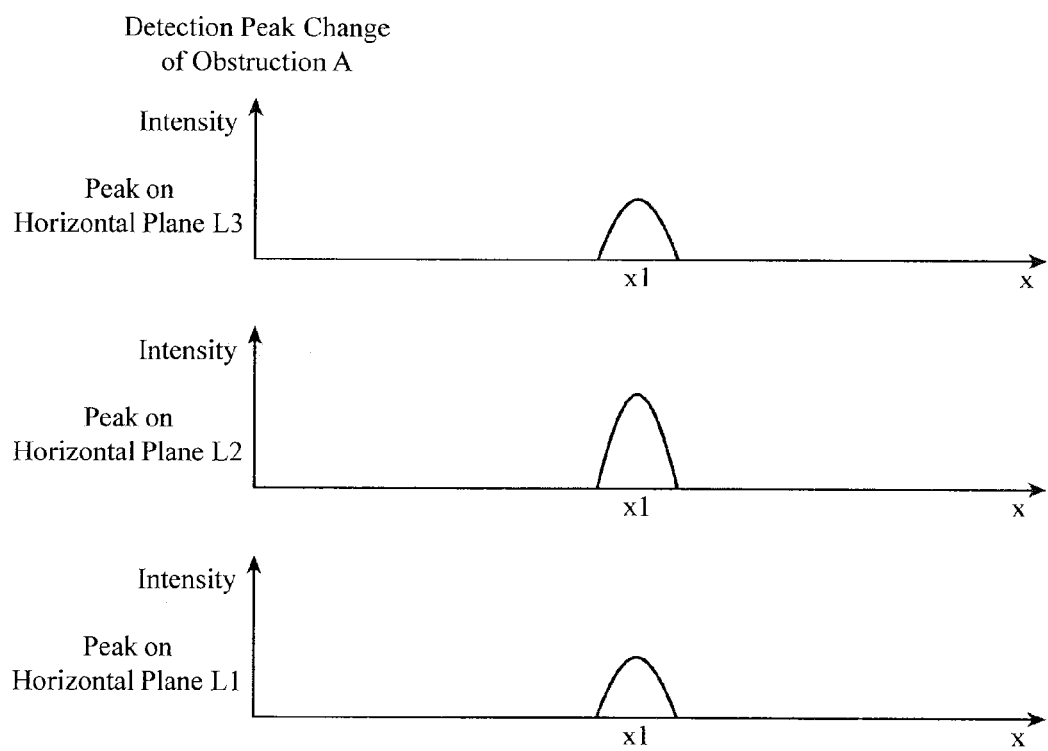
FIG. 13 is a view showing changes in detection peak of the obstruction A of the object detection device in accordance with Embodiment 2.

On the other hand, when the distance image in the specific horizontal plane L1 by the ultrasonic wave u1, and the distance image in the specific horizontal plane L3 by the ultrasonic wave u3 are created, in any cases, the image appears at the position x1; however, the signal intensity is weakened under the influence of the directivity of transmission/reception of the ultrasonic sensor. FIG. 13 is a view showing the peaks of the signals of the distance images created in the specific horizontal planes L1, L2, and L3.

Figure 14:
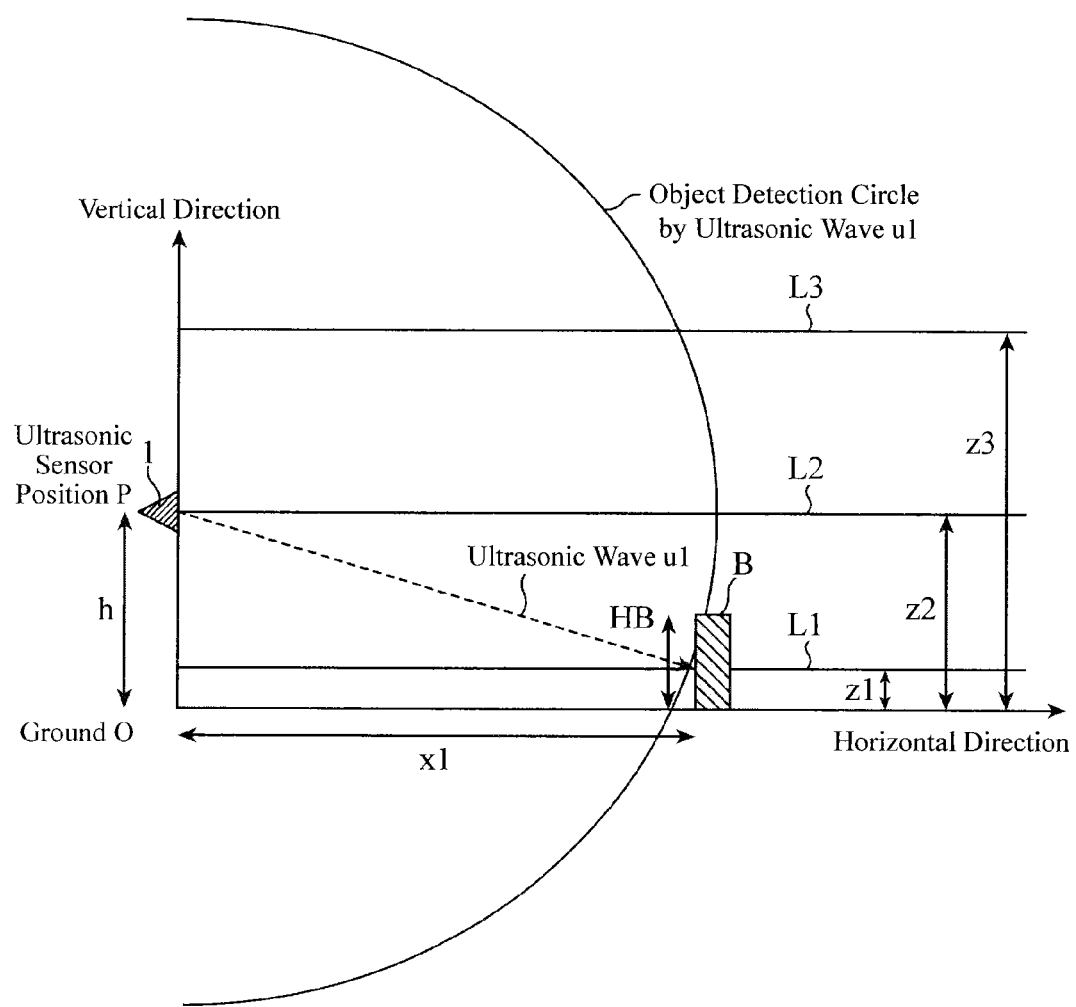
FIG. 14 is a view showing an object detection circle by an ultrasonic wave u1 to an obstruction B of the object detection device in accordance with Embodiment 2.

Next, a case where there exists an obstruction B having a height lower than the disposed position of the ultrasonic sensor 1 shown in FIG. 14 is considered. In this case, the obstruction B is not present at the front of the ultrasonic sensor 1, and hence the object detection circle by the ultrasonic wave u1 is observed most strongly; thus, when the distance image is created in the specific horizontal plane L1, the obstruction B is detected at the position x1. When the distance image is created in the specific horizontal plane L2, no signals from the three ultrasonic sensors overlap each other, so that no image appears. But, a peak actually appears at a position x2 where the object detection circle between the two ultrasonic sensors by the ultrasonic wave u1 is intersected with the specific horizontal plane L2. However, in the specific horizontal plane L2, there is no point at which the object detection circles overlap among all the three ultrasonic sensors, which results in the peak with a lower intensity as compared with the peak in the specific horizontal plane L1. Further, though the position x2 appears at a position more distant from the position x1, this is due to the fact that the object detection circle by the ultrasonic wave u1 crosses at a position more distant from the position x1 in the specific horizontal plane L2.

Figure 15:
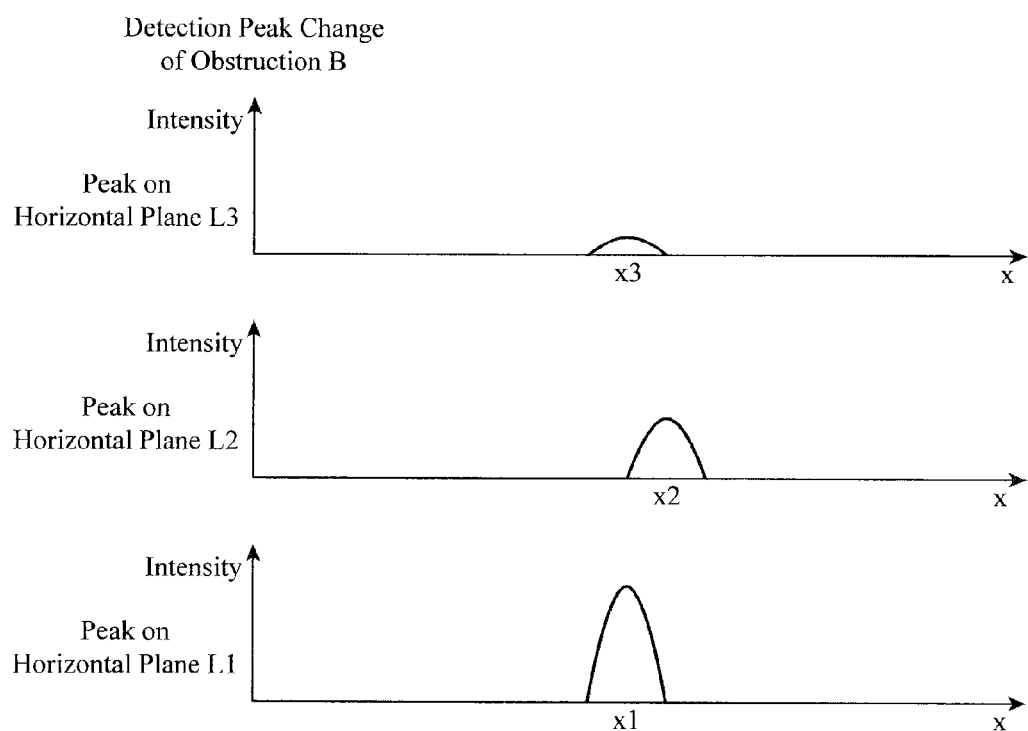
FIG. 15 is a view showing changes in detection peak of the obstruction B of the object detection device in accordance with Embodiment 2.

Similarly, when the distance image in the specific horizontal plane L3 is created, the peak appears at a position x3 closer to the ultrasonic sensor 1 side than the position x2. The peak at the position x3 becomes a peak with a further lower intensity because the focuses of the three ultrasonic sensors are further shifted from one another. FIG. 15 is a view showing the peaks of the signals where the distance images of the obstruction B in the respective specific horizontal planes L1, L2, and L3 are created.

The distance information change amount acquisition unit 11 creates the distance images in the specific horizontal planes L1, L2, and L3 by the foregoing processing, and calculates the detection position of the obstruction. Further, a difference between the distance images in the vertical direction to the specific horizontal planes L1, L2, and L3 is calculated, thereby to calculate the change amount of the signal intensity in the said vertical direction. Incidentally, when the difference between the distance images in the vertical direction is calculated, a reference plane for difference calculation is set, such that the difference is calculated with the specific horizontal plane L1 at the lowest position as a reference. The object height detection unit 12 refers to the detection position of the object in the distance image and the change amount of the signal intensity in the vertical direction acquired in the distance information change amount acquisition unit 11, and acquires the height information of the obstruction. The acquired height information may be displayed in the display unit 9, or may be outputted to the object detection unit 8. The object detection unit 8 detects the obstruction with taking into consideration the acquired height information.

Referring to the results shown in FIGS. 13 and 15, a description will be given of the acquisition of the specific height information. First, there is a difference in mode of change of the peak intensity between the obstruction A having a height equal to or higher than an installed position height h of the ultrasonic sensor 1 and the obstruction B having a height less than the installed position height h of the ultrasonic sensor 1. Therefore, the height of the obstruction is detected such that a judgement is made as to each of the signal intensities in the specific horizontal plane L1 existing at a lower position than the installed position height h of the ultrasonic sensor 1, in the specific horizontal plane L2 at a height comparable to the installed position height h of the ultrasonic sensor 1, and in the specific horizontal plane L3 at a higher position than the installed position height h of the ultrasonic sensor 1 correspond to either of the following two conditions:

Condition 1: Intensity in specific horizontal plane L1, Intensity in specific horizontal plane L3<Intensity in specific horizontal plane L2;

Condition 2: Intensity in specific horizontal plane L2<Intensity in specific horizontal plane L1, and Position x2 in specific horizontal plane L2>Position x1 in specific horizontal plane L1.

When the obstruction satisfies Condition 1, it is judged as an obstruction that is higher than the installed position height h of the ultrasonic sensor 1. Conversely, when the obstruction satisfies Condition 2, it is judged as an obstruction that is lower than the installed position height h of the ultrasonic sensor 1.

As described above, in accordance with Embodiment 2, it is configured to include: the distance image change amount acquisition unit for acquiring the detected position of the object and the change amount of the signal intensity in the vertical direction to the specific horizontal plane of the object; and the object height detection unit for detecting the height of the object from the change amount of the signal intensity, and hence it is possible to discriminate between the object having the height equal to or higher than the installed position height of the ultrasonic sensor and the object having the height less than the installed position height of the ultrasonic sensor 1 from the detected position of the object and the change amount of the signal intensity.

Embodiment 3

In Embodiment 2 mentioned above, it is configured such that the three ultrasonic sensors 1a, 1b, and 1c are arranged on the same plane, and there is shown the configuration for performing only the discrimination between the object lower than the installed position height h of the ultrasonic sensor 1 and the object higher than the installed position height h. For this reason, an object existing at only a higher position than the installed position height h of the ultrasonic sensor 1, in other words, a floating object, an object of which the portion lower than the installed position height h is in a fine shape and difficult to detect itself, and the like, also exhibit the same tendency as that of the obstruction A or the obstruction B mentioned above, and hence it is difficult to discriminate the above objects.

Thus, in Embodiment 3, the following configuration will be shown: at least one ultrasonic sensor of a plurality of ultrasonic sensors is disposed on the horizontal plane different from the installed planes of the other ultrasonic sensors to thus eliminate the symmetry in the vertical direction, and the height of the object is detected under finer conditions.

For example, when one ultrasonic sensor of the three ultrasonic sensors is installed at a lower position than the installed positions of the other two ultrasonic sensors, a more detailed height of the object can be detected by judging whether the following conditions are satisfied or not:

Condition 3: Intensity in specific horizontal plane L1<Intensity in specific horizontal plane L2<Intensity in specific horizontal plane L3; and Condition 4: Intensity in specific horizontal plane L3<Intensity in specific horizontal plane L2<Intensity in specific horizontal plane L1.

When Condition 3 is satisfied, the object can be judged to be present only at a higher position than the installed positions of the two ultrasonic sensors, and when Condition 4 is satisfied, the object can be judged to be an object having a lower height than the installed position height of the one ultrasonic sensor.

As described above, in accordance with Embodiment 3, it is configured such that at least one ultrasonic sensor of the plurality of ultrasonic sensors is disposed on the different horizontal plane from the installed planes of the other ultrasonic sensors, and hence it is possible to discriminate the object existing only at the higher position than the installed position height of the ultrasonic sensor, or the object having the lower height than the installed position height of the ultrasonic sensor. In such a way, when the said object detection device is utilized for rear monitoring of a vehicle or the like, the object existing only at a lower position is judged as a curb, a stopper, or the like, so that it becomes possible to inform a user of another one different from the said object.

Figure 16:
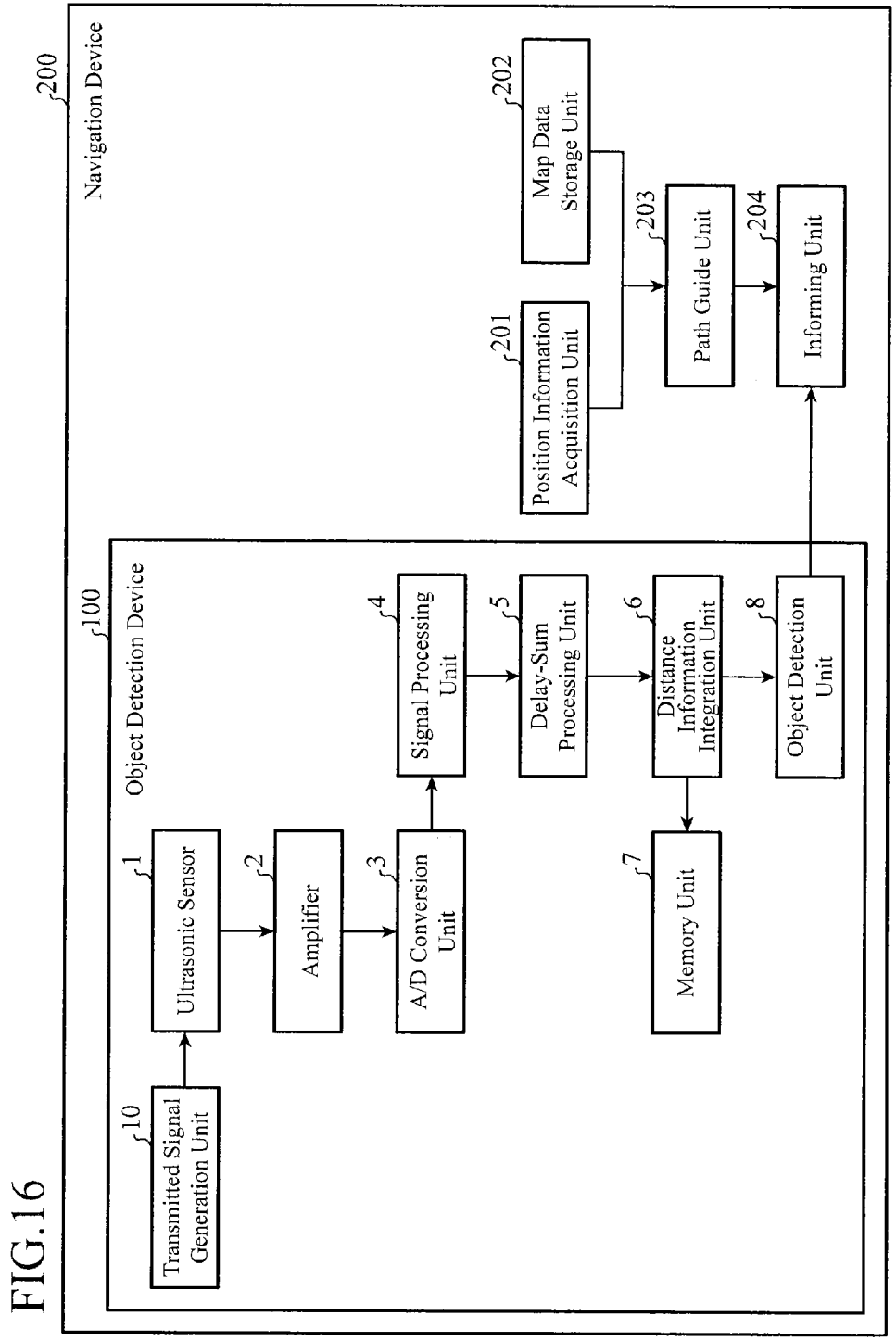
FIG. 16 is a block diagram showing a configuration of a navigation device to which the object detection device in accordance with Embodiment 1 is applied.

Further, the object detection device 100 having the configurations of Embodiment 1 to Embodiment 3 mentioned above may be applied to a navigation device. FIG. 16 is a block diagram showing the configuration of a navigation device mounting thereon the object detection device in accordance with Embodiment 1. A navigation device 200 includes: the object detection device 100 including, for example, an ultrasonic sensor 1, an amplifier 2, an A/D conversion unit 3, a signal processing unit 4, a delay-sum processing unit 5, a distance information integration unit 6, a memory unit 7, an object detection unit 8, and a transmitted signal generation unit 10, each having the same function as that of Embodiment 1; and includes, as a navigation function, a position information acquisition unit 201 for acquiring the current position of its own vehicle, a map data storage unit 202 for storing map data, a path guide unit 203 for guiding the path of its own vehicle with its own vehicle position information and the map data, and an informing unit 204 for presenting the path to be guided to the user.

When the information regarding the object detected by the object detection unit 8 of the object detection device 100 is presented to the user by the informing unit 204 of the navigation device 200, it is possible to provide the object information in conjunction with the path guide. In addition, parking support navigation becomes possible. Further, it is possible to perform obstruction information in start of its own vehicle, and detection and information of entanglement (side-collision) in making a right or left turn of its own vehicle. With these matters, it is possible to enhance the running safety of its own vehicle. Further, the object detection device 100 may include the display unit 9. Further, the configurations of Embodiment 2 and Embodiment 3 may be applied to the navigation device 200 shown in FIG. 16.

Furthermore, to the configurations of Embodiment 1 to Embodiment 3 mentioned above, there may be additionally provided an output unit (not shown) for informing something to the effect that the object detection unit 8 has detected the object by sound or voice.

Moreover, in the configurations of Embodiment 1 to Embodiment 3 mentioned above, it may be configured such that at least one of the two-dimensional distance images acquired by the delay-sum processing unit 5 is displayed at the display unit.

Incidentally, in Embodiment 1 to Embodiment 3 mentioned above, there is shown the configuration in which the specific plane is the plane horizontal to the ground on which the obstruction is disposed; however, the said specific plane may be appropriately set as a plane extending in the perpendicular direction to the gravity, a plane extending in the gravity direction, or the like.

It is noted that according to the present invention, within the scope of the invention, the embodiments can be freely combined, or any components in the embodiments can be modified or any components in the embodiments can be omitted.

INDUSTRIAL APPLICABILITY

As described above, since the object detection device and the navigation device in accordance with the invention are configured to be able to generate two-dimensional distance information suppressed in noise with a small number of sensors, and to acquire three-dimensional object information taking information in the vertical direction to the reference plane into consideration, they are suitable for use in the object detection device for detecting the object based on the reflection results of the transmitted signal, the navigation device to which the device is applied, and the like.

EXPLANATION OF REFERENCE NUMERALS

1 Ultrasonic sensor, 2 Amplifier, 3 A/D conversion unit, 4 Signal processing unit, 5 Delay-sum processing unit, 6 Distance information integration unit, 7 Memory unit, 8 Object detection unit, 9 Display unit, 10 Transmitted signal generation unit, 11 Distance information change amount acquisition unit, 12 Object height detection unit, 100 Object detection device, 200 Navigation device, 201 Position information acquisition unit, 202 Map data storage unit, 203 Path guide unit, 204 Informing unit

The invention claimed is:

1. An object detection device for transmitting a signal, and detecting an object based on a received result of a reflected signal of the transmitted signal reflected from the object, the device comprising:
   at least one transmitting sensor for transmitting the signal;
   at least two or more receiving sensors for receiving a reflected signal of the signal transmitted from the transmitting sensor;
   a delay-sum processing unit for generating two-dimensional distance information in which two or more reflected signals received by the receiving sensors are delay-summed in a plurality of reference planes set in advance;
   an integration unit for generating integrated distance information in which the two-dimensional distance information in the plurality of reference planes generated by the delay-sum processing unit is summed in a vertical direction to the reference planes; and
   a detection unit for detecting an object at a position in which an intensity in the vertical direction is equal to or larger than a threshold value by referring to an intensity in the vertical direction of the integrated distance information generated by the integration unit.

2. The object detection device according to claim 1,
   wherein the receiving sensors includes at least three or more sensors, and
   the delay-sum processing unit generates two-dimensional distance information in which three or more reflected signals received by the receiving sensors are delay-summed in a plurality of reference planes set in advance,
   the device further comprising:
   a change amount acquisition unit for calculating a difference of the two-dimensional distance information in the plurality of reference planes generated by the delay-sum processing unit, and acquiring from the said difference a detected position of the object and a change amount of the reflected signals in the vertical direction to the plurality of reference planes; and
   a height detection unit for detecting a height in the vertical direction of the object based on the detected position of the object and the change amount in the vertical direction of the reflected signals acquired by the change amount acquisition unit.

3. The object detection device according to claim 2, wherein the detection unit detects the object as an object when the height of the object acquired by the height detection unit is equal to or larger than a threshold value set in advance.

4. The object detection device according to claim 1, wherein the delay-sum processing unit generates as the two-dimensional distance information a two-dimensional distance image in at least one reference plane of the plurality of reference planes.

5. The object detection device according to claim 1, further comprising a display unit for displaying the object detected by the detection unit.

6. The object detection device according to claim 1, further comprising an output unit for informing detection of the object in the detection unit by sound or voice.

7. A navigation device mounting thereon an object detection device according to claim 1, comprising:
   a position information acquisition unit for acquiring a current position of the vehicle;
   a map data storage unit for storing map data;
   a path guide unit for guiding a path for the vehicle by using the map data stored in the map data storage unit and the current position of the vehicle acquired by the position information acquisition unit; and
   an informing unit for informing path guide of the path guide unit, and informing the object detected by the object detection device.

8. The object detection device according to claim 1, wherein at least one of the receiving sensors is disposed on the reference plane different from the installed planes of the other ultrasonic sensors.

* * * * *